No. 610,871. Patented Sept. 13, 1898.
M. H. SMITH.
STEERING HANDLE FOR MOTOR CARS.
(Application filed Jan. 3, 1898.)
(No Model.)
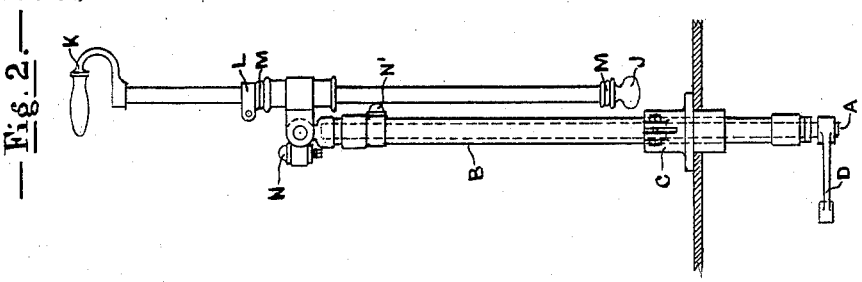
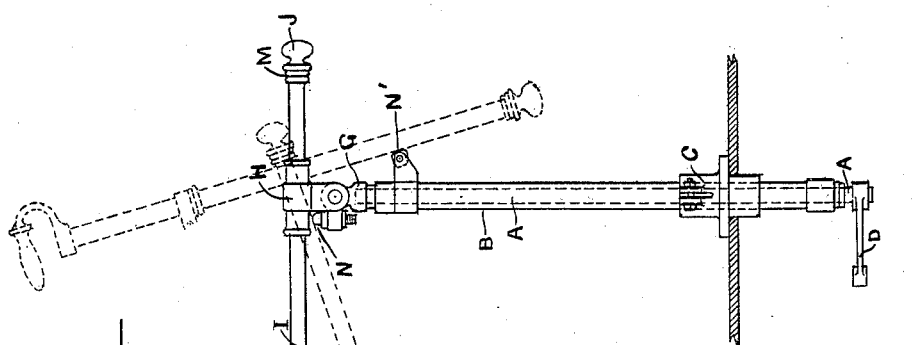
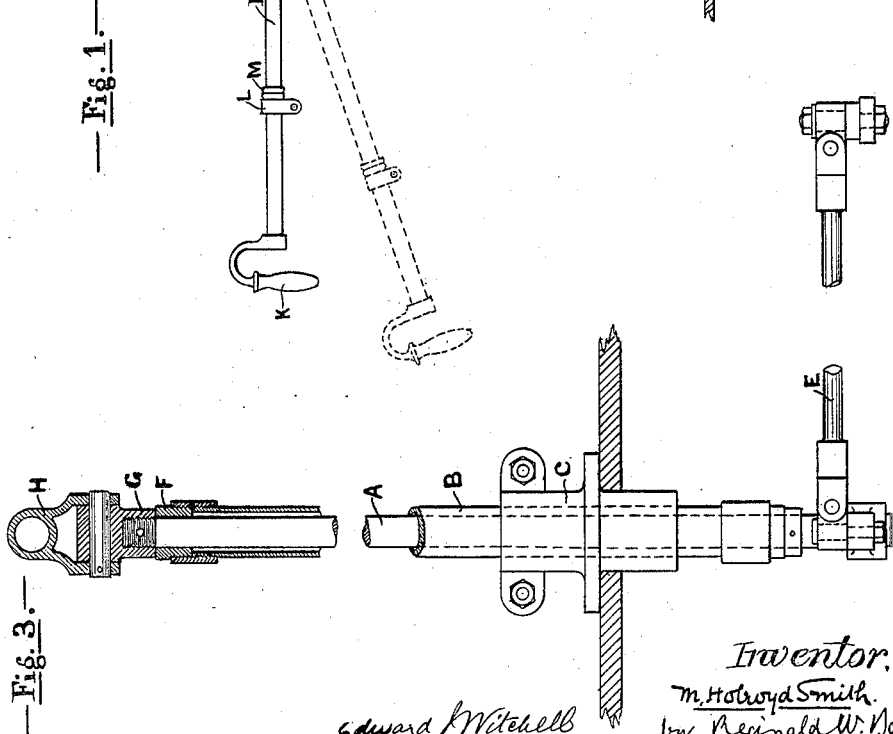

UNITED STATES PATENT OFFICE.

MICHAEL HOLROYD SMITH, OF LONDON, ENGLAND.

STEERING-HANDLE FOR MOTOR-CARS.

SPECIFICATION forming part of Letters Patent No. 610,871, dated September 13, 1898.

Application filed January 3, 1898. Serial No. 665,469. (No model.)

*To all whom it may concern:*

Be it known that I, MICHAEL HOLROYD SMITH, a subject of the Queen of Great Britain and Ireland, and a resident of Albany Buildings, 47 Victoria street, Westminster, London, in the county of Middlesex, England, have invented Improvements in Apparatus for Steering Motor-Cars or other Vehicles, of which the following is a full, clear, and exact specification.

In motor-cars as hitherto constructed drivers suffer considerable inconvenience and discomfort through the muscular energy expended in steering and the vibration communicated to the hand through the steering-lever, which is often inconveniently in the way when the driver wishes to enter or leave the vehicle. The object of my invention is to remedy these defects, and will be more readily understood by reference to the accompanying drawings.

Figures 1 and 2 are side elevations, and Fig. 3 is an end view, of the head and barrel.

My invention can be used to operate the swiveling axle of a carriage, the ends of which form the bearings for the wheels, or single or double steering-wheels held in forks or otherwise; but I preferably employ the well-known arrangement of the steering-wheels (when two) being separately hinged upon a stationary axle bar or frame. Each wheel-axle is provided with a bell-crank lever placed at such an angle that when coupled together by a connecting-rod the two wheels are parallel with each other when the car is proceeding in a straight line; but when it is desired to turn the car their relation to each other changes in a degree proportional to the radius of the curve to be traversed.

My invention consists in the mechanism for operating the steering-wheels, and I employ an upright shaft A, turning in a tube or standard B, so held in a clamp C or fixed on the car body or frame that its height can be easily adjusted when desired. The bottom of this shaft is provided with a lever or crank D, whose normal position is preferably at right angles to the wheel-axles or parallel with the central axis of the car. The outer end of this lever can, by an articulated rod E, be coupled to the crank, lever-fork, connecting-rod, or whatever arrangement is used on the wheel-axles for operating them.

The vertical shaft A passes through a bearing F at the top of the tube and is fitted with a head G, to which is hinged a rocking barrel H, which lies (in plan) in the same direction as the crank or lever D at the foot of the shaft.

Through the barrel H slides a bar I, preferably a weldless steel tube, the outer end being provided with a terminal J and the inner end with a handle K of any convenient shape.

On the tube within reach of the thumb or finger of the driver can be placed a bell of the cycle type; or a clapper-bell can be placed on the handle, which can be sounded by shaking the hand. An adjustable collar L is also placed on the tube to regulate the distance it can be moved, and rubber rings M or rings of leather or other suitable material are interposed, as shown, to prevent jar when the tube is drawn to and fro in the barrel.

The heading at the top of the shaft A or the bearing at the top of the standard B is provided with adjustable cushioned stops N N' to regulate the rocking of the barrel. The inner one, N, is preferably so set that the handle when drawn toward the driver may rest upon his knee, and the outer one, N', so that when the handle is lifted and the tube pushed forward or allowed to slide through the barrel it may fall to any angle (see Fig. 1) or parallel with the standard, (see Fig. 2,) if so desired. It will be seen by this arrangement that the length, height, and position of the steering-lever may be varied at will and that by reason of the articulated connections no vibration is communicated to the hand of the driver. This device is applicable to the rudders of boats or other purposes.

The handle may be made hollow, having an elastic portion, which, if pressed, would, by means of a pneumatic tube passed through the steel tube and connected in any convenient way, be used to operate a pneumatic governor for controlling the engine.

The handle-bar instead of being one tube, as shown in Figs. 1 and 3, can, if desired, be made telescopic.

Having now described my invention, what I claim as new, and desire to secure by Letters Patent, is—

1. In steering or controlling gear or the like the combination of a standard, a rocking and swiveling head and a sliding handle-bar substantially as and for the purpose described and illustrated.

2. In steering-gear such as described in claim 1, the adjustable cushions or their equivalent for regulating the slide and tilt of the handle-bar substantially as herein described and illustrated.

3. In steering-gear the combination of a standard and clamping-base as and for the purpose described and illustrated.

In witness whereof I have hereunto set my hand in presence of two witnesses.

MICHAEL HOLROYD SMITH.

Witnesses:
CHAS. ROCHE,
R. J. PARSONS.